Figure 1:
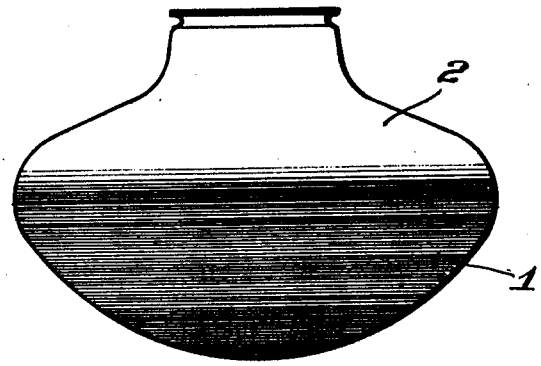

Oct. 14, 1930.                H. H. BLAU                1,778,305
                           INCLOSING GLOBE
                          Filed June 1, 1929

WITNESS
A. B. Wallace.

INVENTOR
Henry H. Blau,
by Brown & Critchlow,
his attorneys

Patented Oct. 14, 1930

1,778,305

UNITED STATES PATENT OFFICE

HENRY H. BLAU, OF CHARLEROI, PENNSYLVANIA, ASSIGNOR TO MACBETH-EVANS GLASS COMPANY, OF CHARLEROI, PENNSYLVANIA, A CORPORATION OF PENNSYLVANIA

INCLOSING GLOBE

Application filed June 1, 1929. Serial No. 367,774.

The invention relates to illuminating units or structures of the type in which a substantial portion of the illumination produced by a light source is derived from rays reflected from a reflector, which, in addition to functioning as such, is translucent to transmit as diffusing light a portion of the light-source rays which strike it, and has particularly to do with inclosing globes for effecting this type of illumination.

With the advent of higher wattage electric lamps, which is the type of light source preferably and primarily contemplated herein, illuminating experts have sought for a durable lighting unit to modify light emanating from such sources in such a way as to combine reduced surface brightness with efficiency in the transmission and reflection of visible radiation, the unit being relatively free from depreciation both by discoloration or deterioration of the material of which it is made and by collection of foreign matter on their surfaces, and the unit being easy and cheap to manufacture, install and maintain.

Of the various illuminating units used in attempts to attain these desiderata, a familiar example is the open top bowl suspended below a light source and having an upper interior light-reflecting surface to direct upwardly for indirect illumination light rays impinging upon it from a source of illumination, the bowl usually being formed of translucent glass to transmit diffused light. The chief disadvantage in the use of such bowls is that dust and other foreign matter readily collects upon their interiors and soon depreciates their light reflecting and transmission properties. Furthermore, the suspension fixtures for such bowls are expensive, and when, as is frequently the case, the bowls are made of cased glass, or are enameled, to effect a desired relative proportion of reflected to transmitted rays, the cost of their manufacture is materially increased.

To eliminate the prejudicial characteristics incident to the use of suspended bowls, inclosing globes formed throughout of translucent glass have been extensively used, such globes so inclosing the light sources that dust and other foreign matter does not accumulate on their interiors. However, relatively large globes are required to properly reduce the brightness of light sources, and the proper distribution of light is effected by the design of the globes and the positioning of the lamps in them. Furthermore, in the use of such globes only a relatively small portion of the illumination is effected indirectly by reflected light.

To improve the illumination effected by inclosing globes of the general type just described, similar globes have been made of either clear or semi-diffusing glasses provided with either enameled or cased glass portions for increasing their reflecting properties and for diffusing transmitted light. For example, the usual forms of such inclosing globes for interior room illumination have their bottom portions enameled to reflect light upwardly through upper clear or semi-diffusing portions, or their bottom portions are cased with layers of completely diffusing glass for the same purpose. In both these cased and enameled globes it has been difficult, if not impossible, to obtain efficiency in illumination and a proper balance between reflected and transmitted light. Also, their manufacture is attended by special operations, either casing or enameling, which adds to the cost of their production, and in the case of enameled globes the enamel is subjected to deterioration.

The object of this invention is to provide a light-source-inclosing globe for efficiently producing the above-described type of combined direct and indirect illumination, which may be manufactured and installed at a comparatively low cost, the illuminating efficiency of which will not permanently deteriorate, and which when used in a lighting unit under the prevailing conditions of service is otherwise free from the prejudicial characteristics which have attended prior units.

Figure 2:
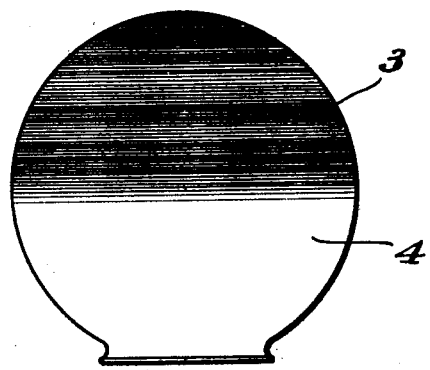
Figure 3:
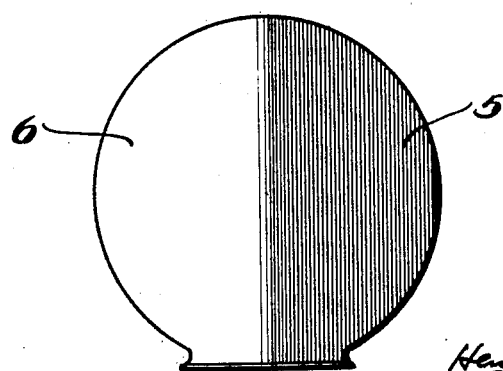

The invention is illustrated in the accompanying drawings, of which Figs. 1, 2 and 3 are side views of three embodiments.

It is known to those skilled in this art that the light transmitting properties of certain glasses may be modified by heat treatment.

Specifically, it is known that certain glasses which are normally clear or semi-diffusing may, by heating to a suitable temperature or by retarding their rates of cooling, be rendered diffusing. Glasses of this general type are herein designated as being thermally opacifiable.

This invention is predicated upon my discovery that from suitable thermally-opacifiable glass compositions, preferably modifications of those heretofore known to me, an inclosing globe may be integrally formed and so thermally opacified locally as to provide it with a translucent portion which with low absorption and with low intrinsic brilliancy transmits from a high intensity light source a suitable amount of diffused light, and which portion efficiently reflects a large amount of light through another portion of the globe which is not thermally opacified, and that the globe when used with a high intensity light source affords a lighting unit which otherwise fulfills to a high degree the above-stated desiderata sought by illuminating engineers.

In the practice of the invention, a globe of the desired shape and size for its intended use may be pressed or blown or pressed and blown, in the usual or any desired manner. Preferably the globe is formed of substantially uniform thickness throughout. Either as a part of its forming operation, or by a subsequent procedure, the globe is so treated as to thermally opacify a desired portion of it. When this is done as a part of the forming operation, provision is made for prolonging the retention of heat in that portion of the globe which it is desired to thermally opacify, and for effecting a normal rate of cooling of the glass forming the other portion of the globe. This may be done by controlling the relative rates of cooling of the parts of a mold adjacent to the two stated portions of the globe.

When, as is preferred, the thermal opacification is effected by a procedure subsequent to the blowing operation, it may be accomplished by locally heating the portion of the globe which is to be thermally opacified. I have successfully thermally opacified the bottom portions of globes by inserting such portions in a suitable opening formed in the wall of a gas fired furnace the temperature of which as indicated by an optical pyrometer was from 950° to 1200° F., the heat of which furnace acted primarily upon the bottom portions of the globes. The upper portions were shielded from the direct action of the heat in such a way that there was produced an adequately sharp line of demarcation between the thermally opacified and unopacified portions of the globe. While I have described these ways of manufacturing globes embodying this invention, it will be understood that the invention is not limited to their use.

Having reference to the accompanying drawings, the inclosing globe shown in Fig. 1 is of a conventional form of interior room illumination having its lower portion 1 thermally opacified to transmit diffused light through it and to reflect light through its upper portion 2 for indirect illumination, the upper portion being untreated, and therefore capable of effectively transmitting not only the reflected light but also the direct upward rays from a light source, such as an incandescent electric lamp inclosed by the globe. In some cases these globes are provided with openings only in their tops, and in other cases they have bottom as well as top openings.

Fig. 2 shows a conventional form of spherical street-lighting globe having a thermally-opacified upper portion 3 and a lower untreated portion 4, each of these functioning in the same general manner explained with reference to the globe of Fig. 1. In Fig. 3 there is shown a conventional form of spherical inclosing globe having one of its sides 5 thermally opacified and its other side 6 untreated, this being representative of the type of globes occasionally used where it is desired to direct to one side of a globe a large portion of the light emanating from a light source, and to have the other side of the globe transmit some diffused light. Modifications of these forms of globes, and of the disposition of their thermally-opacified portions, may be made to give various desired asymmetric distributions of light.

In some cases it is desired to have the untreated portions 2, 4 and 6 of the globes of Figs. 1, 2 and 3, respectively, formed of clear transparent glass for the transmission of both reflected and direct light rays emanating from sources of illumination inclosed by the globes. In other cases, it is desired to have these portions of the globes of a semi-diffusing character to reduce the sharpness of filament images and of fixture shadows, and also to obscure the otherwise exposed lamp fixtures from view. When it is desired to have the untreated portion of a globe of clear transparent glass, the relative proportions of the various constituents of the glass, and particularly the relative proportions of its opacifying to its other constituents are such that the opacifying constituent or constituents do not exert any opacifying effect under normal heat treatment of the glass. When it is desired to have the untreated portion of a globe of semi-diffusing character, the relative proportions of the various constituents of the glass, and particularly the relative proportions of the opacifying to its other constituents are such that the opacifying constituent or constituents do not exert their full effect until the globe is thermally treated in a manner explained. With respect to the relative proportions of their opacifying to their other constituents, and the relative proportions of their various constituents to each other, glasses which I have used to obtain the desired results in the practice of this invention differ from the other thermally-opacifiable glasses known to me.

In the manufacture of globes having clear transparent portions for the transmission of reflected and direct light, glasses resulting from the following batches A and B may be used:

| Ingredients | Batch A | Batch B |
| --- | --- | --- |
| | lbs. | lbs. |
| Sand | 1000 | 1000 |
| Soda ash | 290 | 292 |
| Aluminum hydrate | 35 | 36 |
| Feldspar | 680 | 687 |
| Nitre | 35 | 36 |
| Barium carbonate | 80 | |
| Arsenic trioxide | 7.5 | 7.7 |
| Sodium silicofluoride | 82.5 | 60 |
| Litharge | | 185 |

In the foregoing glasses the constituents are present in such relative proportions and balance with relation to each other that, when melted in a pot heated for about 30 hours at a temperature of about 2625° F. as indicated by an optical pyrometer, there is produced a normally clear transparent glass, but one which may be thermally opacified locally to form a dense highly translucent glass which is at the same time highly reflecting. In these glasses opacity does not exist unless and until they are thermally treated in general manner described.

When, as is preferred, the globes are formed of glass which is normally semi-diffusing, they may be made, in the manner just explained, from glasses resulting from the following batches C and D.

| Ingredients | Batch C | Batch D |
| --- | --- | --- |
| | lbs. | lbs. |
| Sand | 1000 | 1000 |
| Soda ash | 429 | 295 |
| Aluminum hydrate | 286 | 37 |
| Feldspar | 738 | 750 |
| Nitre | 38 | 37 |
| Barium sulfate | 71.5 | 36 |
| Arsenic trioxide | 8 | 8 |
| Sodium silicofluoride | 286 | 83 |
| Salt | 10 | |
| Litharge | 238 | 192 |

In the glasses resulting from batches C and D the constituents are present in such relative proportions to each other that, when melted in the above-described manner, there is produced a semi-diffusing glass capable of being rendered highly diffusing and highly reflecting by the heat treatment already described.

Glasses resulting from the foregoing batches are merely typical, and not limiting. I have found that by the use of these and other glasses, globes may be thermally opacified locally to form highly diffusing and reflecting portions with adequately sharp lines of demarcation between them and the adjoining glass. Furthermore, the glasses are readily workable, and the thermally opacified portions of globes made from them are of very uniform opacity.

When globes embodying this invention are used to inclose high intensity light sources, there result lighting units which embody to a much greater extent than heretofore attained in lighting units the characteristics desired by illuminating engineers. The globes may be comparatively small in size without any portions of the units having excessive intrinsic brilliancy. In the use of units produced with globes having their bottom portions thermally opacified for interior illumination the upward is greater than the downward flux from the units, due to the highly reflecting character of the thermally opacified portions. As a result of this, the greater part of the useful light on the working plane is received from the ceiling of a room in which the units are installed. Because the globes are of the inclosing integral type, the opportunity for foreign matter to enter and settle upon their interiors is greatly reduced, and because they have very smooth surfaces their exteriors may be readily cleaned. Hence the temporary depreciation of the units is small, and, the globes having no enamel or other like coatings, the units in which they are used are entirely free from permanent deterioration.

According to the provisions of the patent statutes, I have explained the principle and operation of my invention, and have disclosed several embodiments of it and examples of how it may be practiced. However, I desire to have it understood that, within the scope of the appended claims, the invention may be practiced otherwise than as specifically illustrated and described.

No claim is made herein for the glass batches which I have disclosed, these being claimed by me in another patent application.

I claim as my invention:

1. A light-source-inclosing globe integrally formed throughout of a chemically-homogeneous differentially-opacified glass, one portion of the globe being translucent to transmit diffused light through it and to reflect light through another portion of the globe.

2. A light-source-inclosing globe integrally formed throughout of a chemically-homogeneous differentially-opacified glass, the bottom portion only of the globe being translucent to transmit light through it and to reflect light through another portion of the globe.

3. A light-source-inclosing globe integrally formed throughout of a chemically-homogeneous thermally-opacifiable glass, one portion of the globe being thermally opacified to transmit diffused light through it and to reflect light through another portion of the globe.

4. A light-source-inclosing globe integrally formed throughout of a chemically-homogeneous thermally-opacifiable glass, substantially half of the globe being thermally-opacified to transmit diffused light through it and to reflect light through the remainder of the globe.

5. A light-source-inclosing globe integrally formed throughout of a chemically-homogeneous thermally-opacifiable glass, the bottom portion only of the globe being thermally-opacified to transmit diffused light through it and to reflect light through the top portion of the globe.

6. A light-source-inclosing globe integrally formed throughout of a chemically-homogeneous thermally-opacifiable normally semidiffusing glass, one portion of the globe being thermally opacified to transmit diffused light through it and to reflect light through another portion of the globe.

7. A light-source-inclosing globe integrally formed throughout of a chemically-homogeneous thermally-opacifiable normally semidiffusing glass, substantially half of the globe being thermally-opacified to transmit diffused light through it and to reflect light through the remainder of the globe.

8. A light-source-inclosing globe integrally formed throughout of a chemically-homogeneous thermally-opacifiable normally semidiffusing glass, the bottom portion only of the globe being thermally-opacified to transmit diffused light through it and to reflect light through the top portion of the globe.

9. The method of manufacturing a light-source-inclosing globe, comprising forming a globe in its entirety of a thermally-opacifiable chemically-homogenous glass, and thermally opacifying only a portion of the globe to render it translucent and reflecting.

10. The method of manufacturing a light-source-inclosing globe, comprising forming a globe in its entirety of a thermally-opacifiable chemically-homogenous glass, and locally heating a portion of the globe to thermally opacify such portion for rendering it translucent and reflecting.

In testimony whereof, I sign my name.

HENRY H. BLAU.